United States Patent

[11] 3,559,556

| [72] | Inventors | Joseph V. McCarthy<br>Needham, Mass.;<br>John R. Manhardt, Nashua, N.H.; Robert<br>W. Willis, Bedford, Mass. |
|---|---|---|
| [21] | Appl. No. | 748,442 |
| [22] | Filed | July 29, 1968 |
| [45] | Patented | Feb. 2, 1971 |
| [73] | Assignee | Itek Corporation<br>Lexington, Mass.<br>a corporation of Delaware |

[54] DENTAL X-RAY FILM PROCESSOR AND PROCESSING CASSETTE
19 Claims, 8 Drawing Figs.

[52] U.S. Cl. .................................................. 95/89,
118/257; 242/67.3, 242/180
[51] Int. Cl. .................................................. G03d 9/00
[50] Field of Search ............................. 95/94, 13,
14, 89, 89(LAM); 118/226, 257; 242/67.3, 180
(Inquired)

[56] References Cited
UNITED STATES PATENTS

| 1,308,709 | 7/1919 | Hamburger | 95/89X(LAM) |
| 2,930,302 | 3/1960 | Tuttle | 95/94X |
| 3,277,809 | 10/1966 | Guzzardi et al. | 95/94 |
| 3,446,134 | 5/1969 | Brown et al. | 95/94 |

*Primary Examiner*—John M. Horan
*Assistant Examiner*—Fred L. Braun
*Attorneys*—Homer O. Blair, Robert L. Nathans and W. Gary Goodson ABSTRACT: A dental X-ray film processor for automatically processing one or more X-ray film segments. The processor is adapted to sequentially strip the film, process the film through a monobath processing cassette and deliver the developed film in one automatic operation. The processing cassette includes a plurality of coacting webs impregnated with the monobath processing solution which is adapted to develop the X-ray film on surface contact. The cassette consists of first and second mounting members which contain the supply rolls and takeup rolls of the coacting webs and are moved in a linear direction toward and away from one another during operation of the processor.

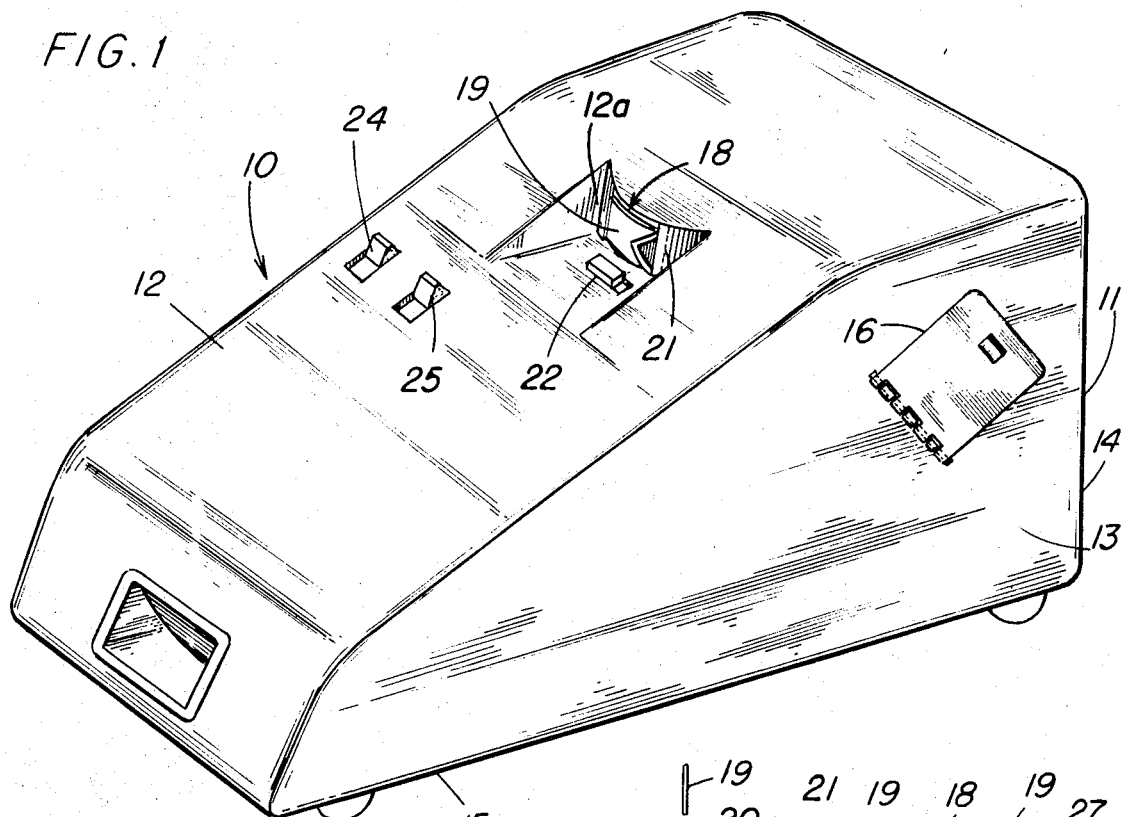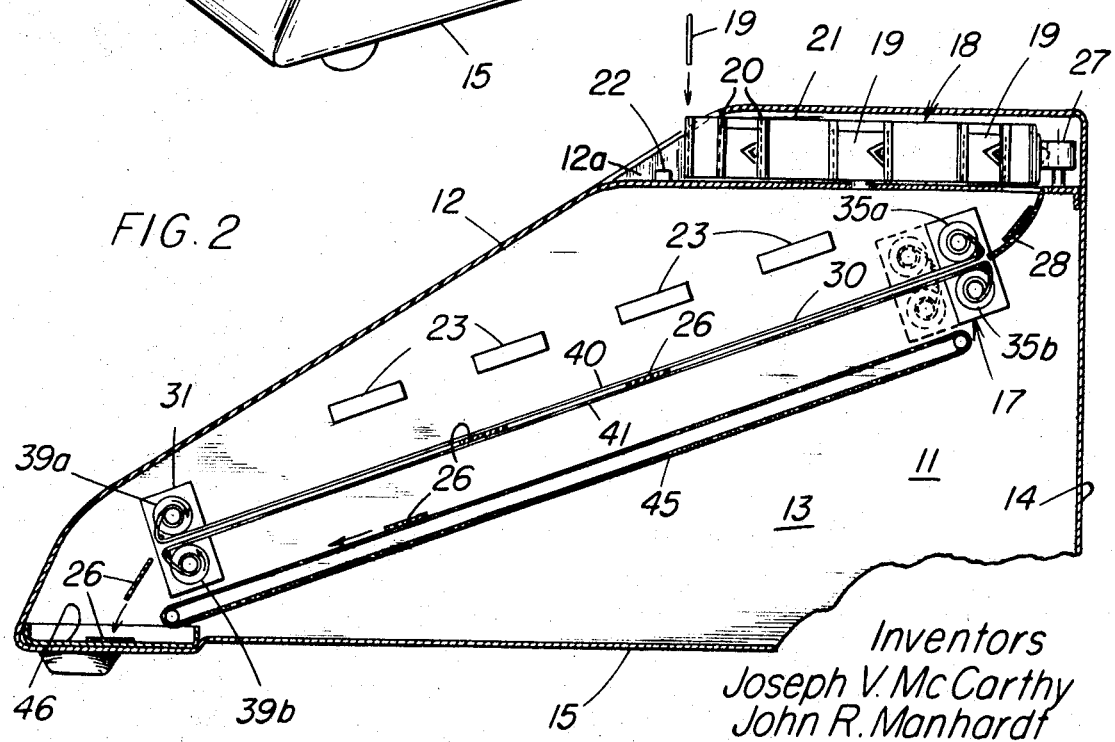

Inventors
Joseph V. McCarthy
John R. Manhardt
Robert W. Willis
By Robert L. Nathans
Attorney

PATENTED FEB 2 1971 3,559,556

Inventors
Joseph V. McCarthy
John R. Manhardt
Robert W. Willis
By Robert L. Nathans
Attorney

DENTAL X-RAY FILM PROCESSOR AND PROCESSING CASSETTE

This invention relates to an apparatus for the processing of photographic film and, more particularly, to a novel and improved automatic processor for dental X-ray film. Moreover, the invention also relates to the provision of a compact, unique X-ray film processing cassette adapted to be utilized in conjunction with the automatic film processor.

The widespread and extensive use of dental X-rays in the examination and treatment of patients by dentists, orthodontists and oral surgeons, has created a need for an efficient and uncomplicated X-ray film processor which may be readily installed and utilized in the dentist's office. Although various types of dental X-ray film processors are currently available, these are subject to serious drawbacks and disadvantages.

In most of the prior art dental X-ray film processors, the films are normally processed under conditions and by means which require the constant attendance and supervision of the operator. Generally, the film is developed and processed in a darkroom where the film must be manually stripped, loaded into a processing device and placed into carefully controlled film processing solutions. The film is then dried and prepared for visual viewing. It becomes readily apparent that this cumbersome X-ray film processing method is not suitable for use in the offices of most busy dental practitioners, who may not have the time or necessary skills to engage in these processing activities. The need for a darkroom and the film processing equipment required in connection therewith, also makes these prior art dental X-ray film developing processes uneconomical for the vast majority of dental practitioners.

More recently, dental X-ray film processors have been developed which eliminate some of these problems. Thus, some of these film processors eliminate the necessity for darkrooms by providing generally self-contained closed units in which the X-ray films may be processed. These film processing units, which may be used in dentists' offices, although providing improvements over earlier film developing processes, are still subject to many disadvantages. For example, presently employed dental X-ray film processors require the manual stripping of the film packets or covers from the film upon insertion thereof into the film processor, and the extensive preparation, mixing and replenishing of processing chemicals or solutions. Although some X-ray film processing units, which are presently commercially available, offer semiautomatic processing features such as film stripping and loading devices, they are still quite difficult to operate, require the manual mixing and replacing of developing chemicals, and moreover, are generally much too expensive to purchase and operate for the great bulk of dentists, orthodontists and oral surgeons.

The dental X-ray film processor, according to the present invention, obviates the shortcomings and disadvantages encountered in prior art film processors and processes, by providing a completely automatic film processing unit of compact modular construction adapted to be readily and simply employed by any dental practitioner. In this connection, the present invention contemplates an X-ray film processor of generally light-tight construction which incorporates a device for stripping the exposed film and conveying it into a novel film processing cassette. The cassette includes a pair of coacting webs having at least their contacting surfaces coated or impregnated with a viscous "monobath" type photographic film-processing solution or chemical. In essence, the exposed and stripped X-ray film is automatically and sequentially conveyed to and encompassed between the processing solution-containing surfaces of the webs, the latter of which convey the film through the film processor under predetermined conditions of temperature and for a specific duration of processing time. Subsequently, and also automatically, the processed film is released from between the processing webs and conveyed into a receiving tray or outlet for viewing by the operator or dental practitioner.

Accordingly, one of the novel features of the present invention lies in the provision of a unique film processing cassette employing a plurality of webs containing a liquid or viscous "monobath" photographic processing solution which will permit a dental practitioner or operator to process dental X-ray film without the need to prepare and replenish film processing solutions or chemicals. Another feature and advantage of the present invention lies in the provision of a fully automatic and compact modular X-ray film processor which is adapted to receive the aforedescribed film processing cassette, and which will in one sequential and complete operation, strip the film, convey the film through the processing cassette portion of the processor, and deliver the developed film for viewing.

From the foregoing, it becomes readily apparent that the dental X-ray film processor and cassette, according to the present invention, presents appreciable advances over prior art processors by its fully automatic operation which, after the loading of exposed film into the film processor, eliminates the necessity for constant attendance by an operator, avoids the need for manual stripping of the film, mixing and replenishing of processing chemicals and the necessity of a darkroom. Furthermore, the simple mechanical and compact construction of the present dental X-ray film processor makes it extremely economical to purchase and maintain by dental practitioners.

Accordingly, it is a primary object of the present invention to provide for an improved dental X-ray film processor.

Another object of the present invention is to provide a dental X-ray film processor for the automatic sequential processing of exposed film segments.

A further object of the present invention to is to provide a dental X-ray film processor incorporating a film processing cassette including processing solution-containing webs adapted to photographically process and convey the film through the processor.

A still further object of the present invention is to provide a novel dental X-ray film-processing cassette for use in an automatic film processor.

Yet another object of the present invention is to provide a dental X-ray film-processing cassette including a plurality of moveable processing webs coated with a viscous or liquid processing solution for photographically developing film positioned between the processing webs.

For a better understanding of the present invention, together with other and further examples thereof, reference is made to the following description taken in connection with the accompanying drawings, wherein:

FIG. 1 illustrates an elevational view, in perspective, of a dental X-ray film processor according to the present invention;

FIG. 2 is a side elevational view, in section, of the film processor shown in FIG. 1;

Figure 3:
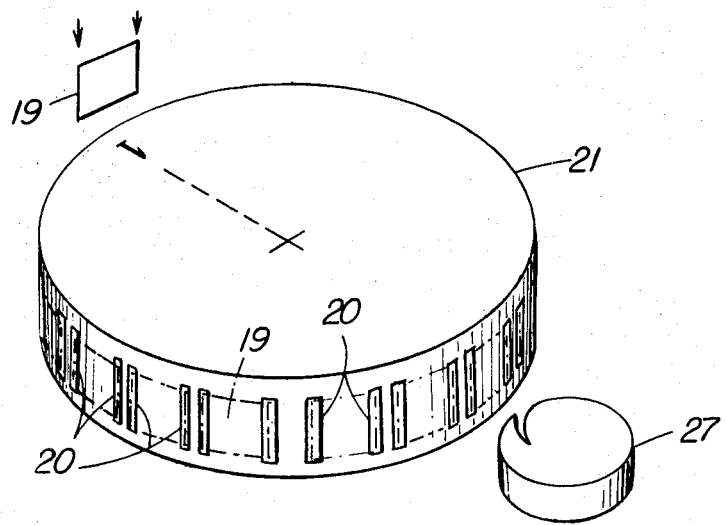
FIG. 3 is a perspective view of the film loading and stripping portion of the film processor in a film loading position.

Referring now to the drawings, and in particular, to FIGS. 1 and 2, the dental X-ray film processor, generally designated as 10, comprises a housing 11 of closed, light-tight construction. The housing 11 includes a sloping upper wall surface 12 joined to depending sidewalls 13, rear wall 14, and bottom wall 15.

One of the housing sidewalls 13 includes an aperture covered by a hinged door member 16 adjacent to the upper portion of the housing 11. The door member 16 is provided for the purpose of facilitating the insertion and removal of a photographic processing cassette, generally designated as 17, into the film processor 10. In the upper portion of the film processor 10, located above the processing cassette 17, is a film stripping and conveying mechanism 18, to be more fully described.

In order to obtain fully processed dental X-ray film, which may have been taken by the dental practitioner in his office only minutes before, the dentist or an operator inserts the exposed film packets 19 into suitable grooves 20 provided about the periphery of a rotatable loading drum 21, the latter of which constitutes a portion of the film stripping and conveying mechanism 18. The loading drum 21 is accessible from the exterior of the housing 11 by means of an aperture 12a provided in the sloping upper wall surface 12. A suitable advance switch 22 for actuation of the loading drum 21 is provided adjacent to aperture 12a.

Prior to the sequential insertion of the exposed film packets 19 into the loading drum 21, one or more heating elements 23 within housing 11 may be actuated by means of a control switch 24 on the film processor 10, in order to provide a controlled thermal environment during the film processing sequence. Similarly, and concurrently therewith, an automatic cycling switch 25 on film processor 10 may also be actuated in order to initiate the film-processing and developing cycle.

Figure 4:
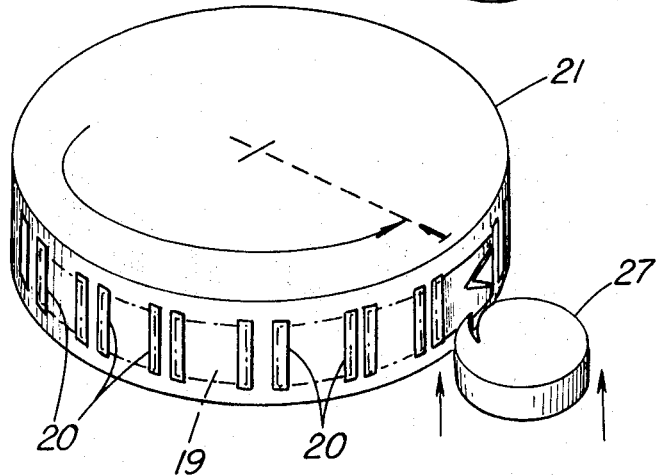
FIG. 4 is a perspective view similar to FIG. 3 with the film processor portion shown in a film stripping position.
Figure 5:
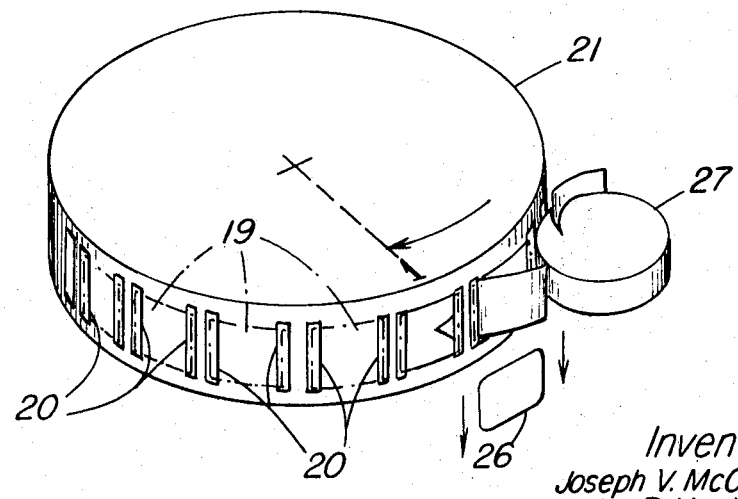
FIG. 5 is a perspective view similar to FIG. 3 with the film processor portion shown in a film extracting position.

As the film packets 19 are loaded into loading drum 21, as illustrated in FIGS. 3, 4 and 5 of the drawings, the loading drum rotates about a vertical axis upon actuation of advance switch 22, driven by suitable motive means (not shown), and conveys the exposed film packets 19 to the position where the packets opening tab engages a hook wheel 27. The loading drum 21 is then rotated backward through a predetermined finite angle, pulling the inner casing of the packet free of its light-tight outer container. The exposed film is then free to fall into transfer chute 28, and into the throat of the processing web system, comprising cassette 17. Although the loading drum 21 may contain suitable film packet-stripping means (not shown) adapted to remove the inner casings from the light-tight outer containers and lead shielding whereby the exposed film falls into transfer chute 28, other film packet-stripping methods quite readily suggest themselves. For example, in lieu of the loading drum, 21, there can only be provided a generally light-tight chamber having closable apertures through which a practitioner or operator may insert his hands. The operator will then be able to manually strip the exposed film from its enveloping container and lead shielding within the darkened environment of the chamber. At this time the operator may place the stripped film into the transfer chute 28 for conveyance toward cassette 17, while removing the opened empty container and lead shielding.

Alternatively, a dental film packet-stripping device may be incorporated whereby the film packets are conveyed along a plurality of sequential film packet-stripping elements positioned within the darkened chamber of the apparatus, and which elements, in essence, replace the loading drum 21. A typical film packet-stripping device of this type is disclosed and demonstrated in U.S. Pat. No. 3,277,809.

Figure 7:
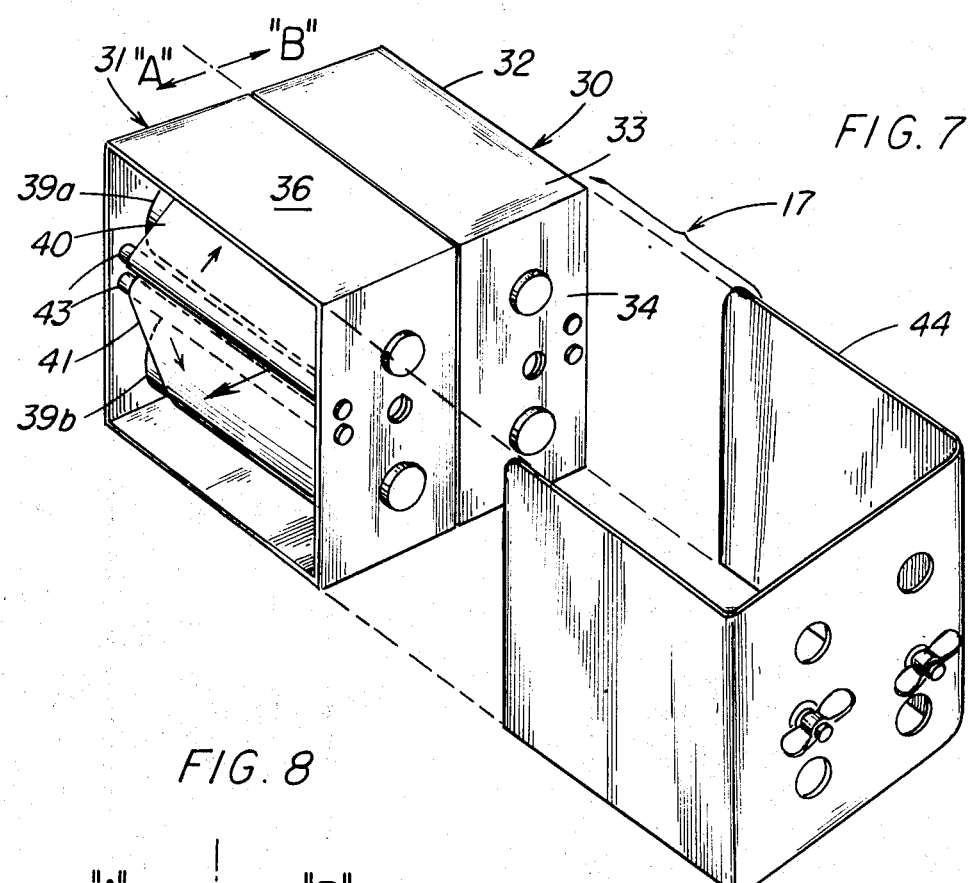
FIG. 7 is an exploded perspective view of a film processing cassette according to the present invention.
Figure 8:
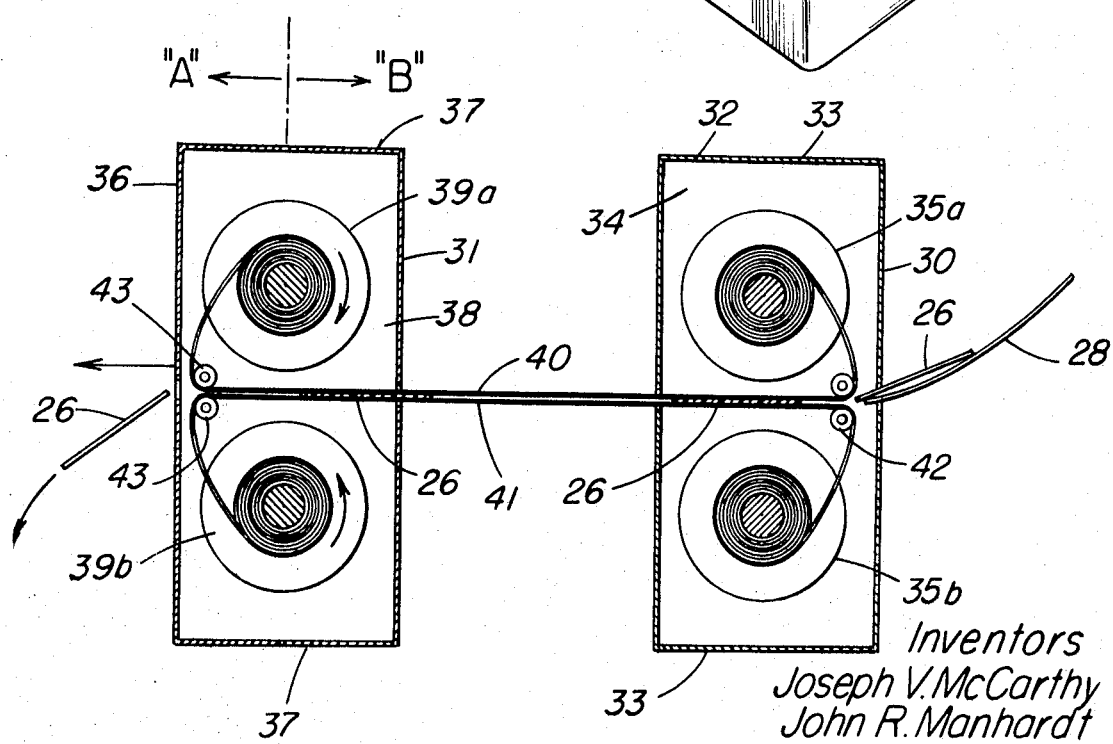
FIG. 8 is a sectional view of the film processing cassette of FIG. 7, with the cassette cover removed, in an extended position.

The film-processing cassette 17, according to the present invention, as illustrated in FIGS. 7 and 8 of the drawings, comprises a film-processing web supply portion 30, and a web takeup portion 31. The web supply portion 30 consists of a generally rectangular mounting from frame 32 having upper and lower wall members 33 and connecting sidewall members 34. A pair of parallel mounted web supply spools 35a and 35b are positioned one above the other and rotatably journaled between sidewall members 34. Although the cassette 17 is described as containing supply spools 35a and 35b, it is obvious that these could be positioned in separate cassettes. Preferably, however, the cassette 17 should be of a hermetically-sealed construction until ready for installation and use in the film processor.

Similarly, web takeup portion 31 consists of a generally rectangular mounting frame 36 which is practically identical in construction to supply mounting frame 32. Takeup mounting frame 36 includes upper and lower wall members 37 and connecting sidewall members 38. A pair of parallel mounted web takeup spools or rolls 39a and 39b are positioned one above the other and rotatably journaled between sidewall members 38.

An upper film processing web 40 connects upper supply spool or roll 35a and upper takeup roll 39a, whereas a lower film processing web 41 extends parallel to web 40 and connects lower supply roll 35b and lower takeup roll 39b. The processing webs 40 and 41 are initially wound about their respective web supply rolls 35a and 35b and have their free ends attached to takeup rolls 39a and 39b. In order to maintain a predetermined spacing between the adjacent parallel extending surfaces of webs 40 and 41, the webs are entrained about a pair of rotatable guide rollers or sleeves 42 extending between sidewalls members 34 of web supply mounting frame 32; and are similarly entrained about a pair of rotatable guide rollers or sleeves 43 extending between sidewall members 38 of web takeup mounting frame 36.

The adjacent or contacting surfaces of webs 40 and 41 are coated or impregnated with a viscous photographic "monobath" processing solution. As referred to herein, the term "monobath" defines a viscous solution of photographic processing material or chemical used to simultaneously develop and fix a latent image on a photosensitive film material. The webs 40 and 41 also serve as carrier for the byproducts of the film development.

In order to operatively position the film-processing cassette 17 within the film processor 10, the hinged door member 16 in housing sidewall 13 is swung open. The film processing cassette 17, which has its web supply and takeup portions locked together by means of a generally U-shaped bracket cover member 44, is slid into the interior of housing 11 through the aperture beneath door member 16. A plurality of finger members or mounting rods (not shown) are cantilevered inwardly of the housing 11 from the opposite sidewall 13, and the are adapted to interfittingly engage with web supply and takeup rolls 35a, 35b, 39a and 39b, as shown in the dotted position for the cassette 17 in FIG. 2 of the drawings. The cassette cover member 44 is then manually withdrawn from housing 11 and the door member 16 closed over the aperture.

As a stripped film segment or chip 26 approaches the bight between processing web supply rolls 35a and 35b, as shown in FIG. 8, suitable mechanisms controlled by timers and associated with the finger members which mount web takeup rolls 39a and 39b, move the fingers toward the front of the hosing 11 over a predetermined distance, so as to concurrently move the takeup portion 31 to the cassette 17 in the direction of arrow "A" over a corresponding distance. At this time, the takeup rolls 39a and 39b are prevented from rotation, and thereby cause the web supply rolls 35a and 35b to roll counterrotatably in order to unwind and convey webs 40 and 41 in the direction of movement of takeup portion 31. The pulling motion of webs 40 and 41 will draw the film segment 26 through the bight between web supply rolls 35a and 35b and cause the film to be encompassed or sandwiched between the processing solution coated surfaces of webs 40 and 41. Contact with the "monobath" solution for a predetermined period of time and under thermal developing conditions provided by heating elements 23 will rapidly process the developing of film segment 26.

After a predetermined period of time, in response to a suitable timer, an electric motor or mechanical device will impart counterrotative motion to web takeup rolls 39a and 39b in the direction of the arrows shown, while concurrently preventing rotation of web supply rolls 35a and 35b. As a result, the webs 40 and 41 will be wound about takeup rolls 39a and 39b so as to move cassette takeup portion 31 back toward the supply portion 30 as shown by arrow "B." The winding up of the webs 40 and 41 about takeup rolls 39a and 39b will permit the processed film segment 26 encompassed between webs 40 and 41 to pass through the bight between takeup rolls 39a and 39b.

This, in effect, will facilitate removal of the developed film segment 26 from the housing 11. In the embodiment of FIGS. 1 and 2, a movable endless conveyor belt 45 may be positioned below the cassette 17 along the length of housing 11. The belt 45 is adapted to receive developed film segments 26 exiting from between takeup rolls 39a and 39b at any point and convey them into a receptacle 46 for removal from the film processor 10.

When a plurality of film packets 19 is processed through the film processor 10 in sequential order, a plurality of suitable timers may impart incremental motion to the takeup portion 31 timed in relationship to the feeding cycle of the loading drum 21. For example, completion of the timing cycle provides the signal for the incremental winding of the webs 40 and 41 about rolls 39a and 39b in order to take up the processing webs at a predetermined interval which will accurately control the developing time for each of the film segments 26. The timing interval is initiated upon outward movement of the web takeup assembly and is completely independent of the cycle initiated by introduction of additional film chips.

Figure 6:
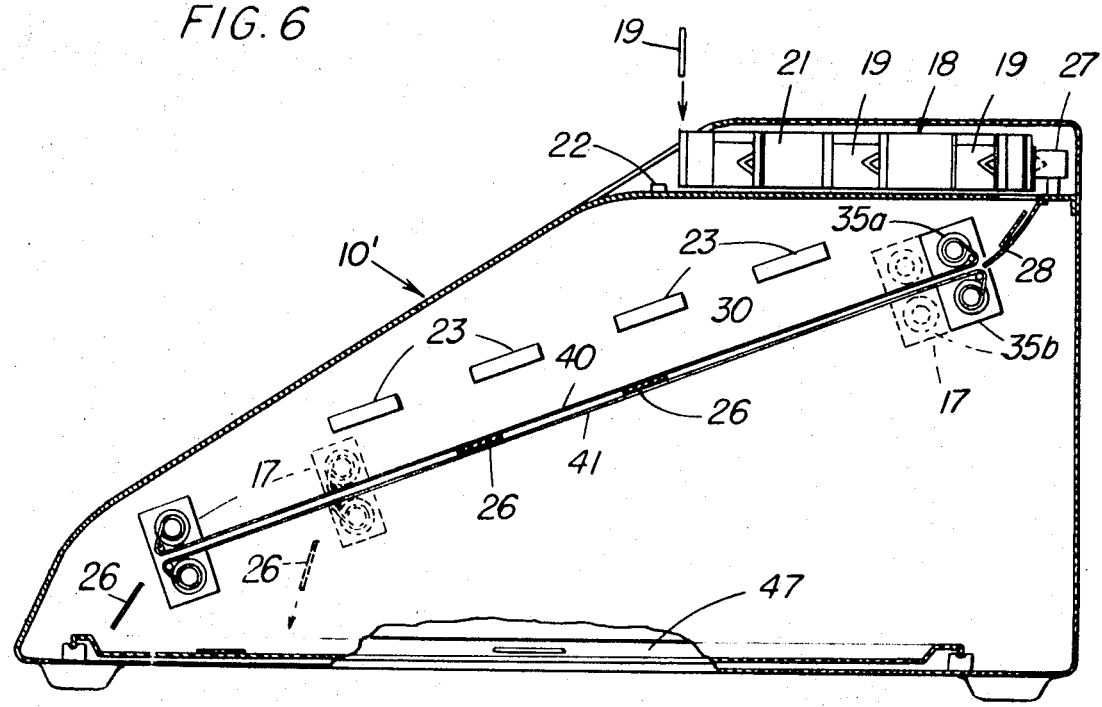
FIG. 6 is a side elevational view, in section, of a second embodiment of a film processor.

The embodiment of the film processor 10' illustrated in FIG. 6 of the drawings is in most respects identical to that shown in FIG. 2. However, in this embodiment, rather than having the processed film segments transported to a movable endless conveyor 45, the takeup rolls 39a and 39b deposit the film segments 26 in sequential developing order in a receiving tray 47 provided in the bottom of housing 11. After the processing of the film segments 26 is completed, the receiving tray containing the sequentially aligned developed X-ray films may be removed by simply sliding it out of the housing 11.

Having described the invention in detail, it will be apparent that various modifications will occur to those skilled in the art, such changes being within the spirit and scope of the invention which is limited only as defined in the claims following.

We claim:

1. An automatic film processor for dental X-ray film in packets, comprising:
   a generally closed housing having aperture means for inserting into said housing one or more film packets in sequential order;
   means within said housing for stripping the packet from the enclosed film and conveying said film toward a film processing means;
   said film processing means comprising a pair of parallel webs;
   actuating means imparting movement to said webs so as to position said film therebetween in web surface-contacting relationship, at least one of the film contacting surfaces of said webs including a coating of a photographic processing solution for developing of said film; and
   control means for subsequently moving said webs relative to the film encompassed therebetween so as to facilitate removal of said developed film from said processor.

2. A film processor as defined in claim 1 wherein:
   said actuating means is adapted to impart incremental movement to said webs in response to insertion of a plurality of film packets into said housing;
   said film being positioned between said webs in sequential order; and
   said control means adapted to move said webs relative to said plurality of film segments so as to sequentially release said developed film segments encompassed between said webs at predetermined timed intervals.

3. A film processor as defined in claim 1 including a pair of web supply rolls rotatably journaled in said housing, one of each of said webs being respectively wound about one of each of said supply rolls, said webs extending therefrom in parallel superposed relationship so as to define a developing travel path for the film.

4. A film processor as defined in claim 3 wherein:
   said conveying means conveys said film in the bight between said web supply rolls;
   said actuating means being adapted to exert a tensile force on the parallel portion of said webs; and
   said web supply rolls being rotated counterrotatively in response to said tensile force whereby said film is drawn through said bight and encompassed between the parallel superposed portions of said webs.

5. A film processor as defined in claim 4 wherein:
   said actuating means comprises a pair of web takeup rolls rotatably journaled in said housing in parallel spaced relationship with said supply rolls;
   the distal ends of the parallel portions of each of said webs being respectively fastened to one of each of said takeup rolls;
   means takeup to incrementally vary the distance between said web takeup rolls and said web supply rolls; and
   said last-mentioned means including means for increasing said distance so as to draw said film between said processing webs, and means for reducing said distance whereby developed film between said processing webs may be removed from said processor.

6. A film processor as defined in claim 5 wherein:
   said distance increasing means in parts translational movement to said takeup rolls within said housing; and
   said distance decreasing means imparts counterrotative movement to said takeup rolls whereby said webs are wound up on their respective takeup rolls.

7. A film processor as defined in claim 5 wherein:
   said film processing means comprises a cassette insertable into said housing;
   said cassette including a first mounting portion for said web supply rolls, and a second mounting portion for said web takeup rolls; and
   cassette cover means adapted to maintain said first and second mounting portions in a locked position, said cover means being removable upon insertion of said cassette into said housing so as to release said first and second mounting portions to permit movement between said web supply rolls and said takeup rolls.

8. A film processor as defined in claim 2 including timer means adapted to initiate said incremental web movement, said timer means being adapted to actuate said control means for movement of said webs relative to said film segments after a predetermined time interval and at a predetermined rate of speed.

9. A film processor as defined in claim 1 wherein the film-contacting surfaces of said webs are coated with a viscous monobath photographic processing solution.

10. A film processor as defined in claim 1 wherein the webs are impregnated with a moist monobath photographic processing solution.

11. A film processor as defined in claim 1 wherein heating means are provided within said housing to dry the photographically processed film.

12. A film processor as defined in claim 1 including means for receiving said developed film from said film processing means, said receiving means comprising a movable conveyor in the lower portion of said housing, said movable conveyor adapted to deliver developed film in sequential order into a receiving tray.

13. A film processor as defined in claim 1 including means for receiving said developed film from said film processing means, said receiving means comprising a tray member positioned in the lower portion of said housing and adapted to receive developed film in sequential order.

14. A film processor as defined in claim 1 wherein:
   said film stripping and conveying means comprises a rotatable drum;
   groove means in the peripheral surface of said drum for insertion of film packets therein;
   means cooperative with said drum to strip packets from said film upon drum rotation; and
   means for removing said stripped film from said drum and conveying said film toward said film processing means.

15. A film-processing cassette comprising, in combination:

a pair of parallel extending superposed webs having on at least one of their film-contacting surfaces a film processing agent for processing film positioned between said surfaces;

a pair of rotatable web supply rolls, one of each of said webs being respectively wound about one of each of said supply rolls, said webs extending therefrom in said parallel superposed relationship;

a pair of rotatable web takeup rolls, the distal ends of each of said superposed webs being positioned for winding relationship about one of each of said takeup rolls;

a first mounting means adapted to cooperatively connect said web supply rolls in parallel spaced relationship; and, a second mounting means adapted to cooperatively connect said web takeup rolls in parallel spaced relationship, said second mounting means movably slideable in a linear direction toward and away from said first mounting means whereby processing can be accomplished by moving said second mounting means away from said first mounting means while simultaneously preventing rotation of said takeup rolls, and subsequently moving said second mounting means toward said first mounting means while rotating said takeup rolls and simultaneously preventing rotation of said supply rolls.

16. A cassette as defined in claim 15 including guide roll means extending parallel to said web supply rolls so as to maintain said parallel web portions in superposed proximity.

17. A cassette as defined in claim 16 including guide roll means extending parallel to said web takeup rolls so as to maintain said parallel web portions in superposed proximity.

18. A cassette as defined in claim 17 including a cassette cover member which comprises a generally U-shaped bracket encompassing said first and said second mounting means.

19. A cassette as defined in claim 18 wherein said contacting web surfaces are coated with a viscous layer of a monobath photographic processing solution.